(12) United States Patent
Buckingham et al.

(10) Patent No.: US 8,126,591 B2
(45) Date of Patent: Feb. 28, 2012

(54) ROBOTIC ARMS

(75) Inventors: Robert Oliver Buckingham, Abingdon (GB); Andrew Crispin Graham, Bristol (GB)

(73) Assignee: Oliver Crispin Robotics Limited (GB)

( * ) Notice: Subject to any disclaimer, the term of this patent is extended or adjusted under 35 U.S.C. 154(b) by 1084 days.

(21) Appl. No.: 11/961,473

(22) Filed: Dec. 20, 2007

(65) Prior Publication Data

US 2008/0161971 A1 Jul. 3, 2008

Related U.S. Application Data

(63) Continuation of application No. PCT/GB2006/002284, filed on Jun. 21, 2006.

(30) Foreign Application Priority Data

| Jun. 21, 2005 | (GB) | ................................... 0512581.0 |
| Jun. 21, 2005 | (GB) | ................................... 0512583.6 |
| Jun. 21, 2005 | (GB) | ................................... 0512592.7 |

(51) Int. Cl.
*G06F 19/00* (2011.01)

(52) U.S. Cl. ........ 700/245; 700/247; 700/250; 700/253; 901/2; 901/9

(58) Field of Classification Search .................. 700/258; 701/213; 901/15, 19
See application file for complete search history.

(56) References Cited

U.S. PATENT DOCUMENTS

| 4,551,061 | A | * | 11/1985 | Olenick ........................ 414/735 |
| 5,103,403 | A | | 4/1992 | Ch'Hayder et al. ............ 395/98 |
| 5,317,952 | A | | 6/1994 | Immega ......................... 91/418 |
| 6,089,493 | A | * | 7/2000 | Moore ........................ 242/438.1 |
| 6,917,176 | B2 | * | 7/2005 | Schempf et al. ......... 318/568.11 |
| 7,171,279 | B2 | * | 1/2007 | Buckingham et al. .......... 700/50 |
| 2003/0038725 | A1 | * | 2/2003 | Slomowitz et al. ........ 340/686.1 |
| 2003/0229420 | A1 | * | 12/2003 | Buckingham et al. ........ 700/245 |

FOREIGN PATENT DOCUMENTS

| DE | 43 02 434 | 8/1994 |
| JP | 1 153 292 | 6/1989 |
| JP | 2002 264 048 | 9/2002 |

OTHER PUBLICATIONS

International Search Report, Aug. 22, 2006, 3 pages.

* cited by examiner

*Primary Examiner* — Mary Cheung
*Assistant Examiner* — Jerrah Edwards
(74) *Attorney, Agent, or Firm* — St. Onge Steward Johnston & Reens LLC (57) ABSTRACT

A robotic arm comprises a plurality of articulated elements, and control means for controlling the position of various of the elements such that the arm may adopt serpentine shape for tip following movement. Means for measuring directly the relative positions of at least some of the elements are provided in order to calculate deviation from the theoretical shape, and apply corrections to the arm control means.

16 Claims, 8 Drawing Sheets

ROBOTIC ARMS

CROSS-REFERENCE TO RELATED APPLICATIONS

The present application is a continuation of pending International patent application PCT/GB2006/02284 filed on Jun. 21, 2006 which designates the United States and claims priority from United Kingdom patent application 0512592.7 filed on Jun. 21, 2005, United Kingdom patent application 0512581.0 filed on Jun. 21, 2005 and United Kingdom patent application 0512583.6 filed on Jun. 21, 2005 the content of which is incorporated herein by reference.

FIELD OF THE INVENTION

This invention relates to robotic arms, and in particular to robotic arms having 'tip following' capability.

BACKGROUND OF THE INVENTION

In the field of robotics there has been considerable development of robotic arms having a tip following capability; that is to say, the arm is capable of advancing longitudinally of itself in a snakelike manner. Such arms can carry a workload or tool and can be used for inspection of equipment with restricted access, such as the internal parts of a jet engine.

Tip-following devices in general are used extensively in the medical field in the form of endoscopes and to some extent in industry as boroscopes. These devices, however, rely upon the external environment to guide the work head or inspection mechanism to an appropriate location at which to perform a given task. Endoscopes are usually guided by body orifices and while a certain amount of control may be exercised at an extremity of an endoscope, the fact remains that the main part of an endoscope is essentially passive in which the only guidance is provided by the orifice or conduit within which the device moves.

A major advance in tip following technology for robotic arms is described in our co-pending patent application No. WO 0216995. This application describes and claims a robotic arm comprising a plurality of longitudinal segments, each of which comprises a plurality of passive links. The end of each segment is "guided" by wires so that by varying the length of the wires, the arm can be caused to bend. In a typical arm, it is possible to have a number of segments, say 4 to 20, each containing say 10 to 20 links. By adjusting the tension in the control wires for each segment, the arm can move and adopt various spatial shapes and configurations. This may be done for example by winding each control wire on or off a spindle using a motor. The motors are controlled for example by a computer control system.

The arm is mounted on a base and advanced towards the target, whilst the shape is continuously altered to "follow" the tip.

With such an arm, the articulation of the links is maintained under compression, i.e. by providing tension in each of the control wires, so as to "stiffen" each articulation. This gives the arm spatial determinacy, and results in greater control over the spatial positioning of the arm. Thus it is possible to control a group of links within a segment rather than each link individually using the stiffness of the link design to transmit loads so that any movement and/or load change or moment change is distributed among the links in the segment. Our co-pending application number WO02/100608 also relates to robotic arms where, by interposing a layer of rubber or elastomer either bonded or keyed to two members constituting the articulation between adjacent links within a segment, the rubber layer constitutes a fixed contact surface between the articulated components while at the same time providing the resilient shear capacity necessary to produce "stiffness" of the joint.

In order to provide an arm which is capable of tip following along a predefined path in space in which there is little room for variance or deviation from the defined path, it is necessary to know the exact position and configuration of a large number of elements or components of the arm one with respect to the other. In an "ideal" segment with no friction, and in the absence of externally applied forces such as payloads, gravity, friction etc, each segment will adopt the shape of an arc of a circle having a substantially constant radius of curvature along its length. Furthermore, measurement of the angular displacement of the wire drum or capstan would give an accurate measure of control wire length.

In reality, however, external factors have an effect on each segment, which can alter the shape such that it is no longer a true arc of a circle. Also the wire may slip on the drum under changes in the load on the arm. This makes it more difficult to control the arm to follow a predetermined path, since changes in the attitude of the arm will change the load, weight/friction distribution and hence the shape of the arm itself, causing it to deviate at least in part from the desired path. While some deviation from the desired path may be acceptable in some situations, other deviations certainly will not be.

SUMMARY OF THE INVENTION

This invention aims to alleviate these problems.

According to the present invention, there is provided a robotic arm comprising at least one segment having a plurality of articulated elements, control means for controlling the position of the arm by acting on a control element of the or each segment, and measuring means associated with the control means and arranged to measure the relative position of at least one element in the or each segment with respect to at least one other element in the arm for determining the actual shape of the arm.

Thus the measuring means supplies information relating to the actual arm shape, such that control of the arm can be adjusted to compensate for the variations in arm shape from the predetermined or theoretical shape due to external factors. For example, the arm may include calculating means associated with the control means and the measuring means for calculating a difference between the actual arm shape and a predetermined arm shape, and applying a correction to the control means.

Preferably, the measuring means measures the relative positions of each pair of adjacent elements, or at least of the elements at the end of the or each segment. Thus an accurate picture of the actual shape of the arm may be obtained, enabling calculation of any compensating movement required.

For example, the relative positions may be measured by the observation and measurement of the position of external markers on the arm. In another example, the measuring means is arranged to measure the angular relationship between the transverse planes of the elements or links.

In order fully to describe the spatial relationship of two bodies, six independent descriptors are required. In the simplest form these would be described as X, Y, Z (translation) alpha, beta, gamma (orientations). Translation and orientation is commonly referred to as "pose". Thus in a more accurate arm according to the invention, the measuring means may measure the relative pose of the elements.

For example, the measuring means may comprise means for generating an energy beam carried by the one element, and an array of energy sensing means carried by the other element adapted to sense the energy beam. The array preferably has a dimensional extent greater than that of the beam, such that movement of the one element relative to the other element results in movement of the beam with respect to the array thereby indicating the position of one of the elements with respect to the other.

A plurality of beam and array pairs may be provided at different positions on the elements to permit calculation of the position in space of one element relative to another. Although in theory three sets are sufficient to provide six pieces of information it has been found that four such sets mounted in a plane are desirable. The beam and array sets each provide two pieces of measurement data. These eight pieces of measurement data may then be used within an algorithm to derive the six independent descriptors and hence complete shape information. The energy beam can be any convenient energy beam and more particularly is typically electromagnetic energy usually light, for example generated using an LED. The sensing means may be an elongate array of sensing pixels that extend along the expected path of movement of the beam.

The nature and configuration of the beam may be controlled by projecting the light through a slit. By controlling the separation of the light generating means and the slit, the shape and nature of the beam can be controlled to within fine limits. The beam may be generated to have a penumbra on each side when considered in the direction of potential movement over the array. It is preferred that the penumbra covers at least three pixels of the array so that the graduation of light may be sensed to obtain a clear indication of both the position and the direction of movement of the beam with respect to the receptor pixel array. In this way, the energy source results in a "curtain" of light or energy of unique intensity.

Alternatively, the measuring means may measure directly the distance between adjacent elements at various positions. If this is done for at least three positions, the relative positioning of the transverse planes of the elements may be determined. For example, the measuring means may comprise three linear potentiometers mounted between the elements at or adjacent the periphery thereof. Potentiometers take up very little space and can be sampled quickly.

This measuring means is suitable for types of robotic arms or tip-following devices which are only capable of relative movement between elements in a manner having reduced degrees of freedom (less than the full six degrees of freedom). Thus fewer measurements are needed fully to define the spatial pose of one element relative to another. For example, this is the case where torsional displacement and shear are negligible or effectively eliminated and therefore there is little or no twisting or shearing movement between elements.

Another approach to measuring the inclination of the transverse planes of the elements is to mount accelerometers on the elements. It is preferable to use three accelerometers, one for each axis of rotation of the elements.

By providing measuring means for at least some and preferably all of the elements in each segment, it is possible to undertake continuous monitoring of the relative position of each of the elements relative to a datum for the arm. The overhead in weight is minimal and the signals transmitted by each measuring means may be conveyed to a computer associated with the control means for the arm so that the tension in the wires may be adjusted to correct for unacceptable deviation of elements or groups of elements from a predetermined path, shape or configuration. This in turn permits much greater control over the path following characteristics of the arm and also permits fine adjustment of the tension in the control wires for some or all of the segments to take account of the effect of changes in load, position or work forces generated by the work head at the distal end of the arm.

Where the control means comprise control wires, each may be wound onto a spindle or capstan of constant or varying diameter adjacent the proximal end of the arm. The position of the end of each segment is controlled by winding in or paying out the wires using a motor on each spindle. In this arrangement, the tension at which a wire is wound may vary such that over time the encoder on the motor no longer accurately tracks the wire length. Thus the measuring means may comprise wire displacement measuring means so as accurately to measure the length of each wire and thus the position of the element being controlled by that wire.

The wire displacement measuring means may for example comprise a measuring roller about which the wire passes at an angle, or more preferably a pair of pinch rollers disposed one on either side of each wire, with a sensor to sense the angular displacement of at least one of the rollers. The pinch roller contact force should be sufficient to ensure that displacement of the wire results in corresponding angular displacement of the measuring roller. This direct measurement of actual wire displacement can be used to correct the position determination of the spindle motor encoder.

However, this assumes that the tension in the wire is constant, or at least a function of the displacement of the wire, such that it may be calculated. The tension in the wire affects the wire length due to elasticity of the wire. Thus a more accurate wire movement measuring means comprises two pairs of pinch rollers. The two angular displacement measurements obtained from the rollers can be used to calculate both the wire displacement and the wire tension, and thus more accurately determine wire length.

In another example the wire displacement measuring means may comprise optical or magnetic sensors. For example, each control wire may be provided with a plurality of markers spaced along the wire in the vicinity of an optical sensor, whereby movement of markers, and thus the control wire, may readily be sensed by the optical sensor. The markers may simply be applied to the external surface of the wire, or one of the strands of the wire may be of a different colour from the remainder, the contrast being sufficient to permit sensing of the passage of the strands, thus sensing movement of the wire itself.

Magnetic sensing means may comprise one or more Hall-effect sensors, with magnetic means providing markers at spaced intervals along the control wire in the vicinity of the sensors. The magnetic markers may comprise a plurality of magnets embedded at regular intervals within the control wire. Alternatively the magnetic markers may be achieved by magnetisation of the king wire within the wire assembly or by replacement of the king wire with another form of magnetic strip, whereby the Hall-effect sensors may serve to determine incremental displacement of the control wire in relation to the sensors.

As mentioned above, in order to measure wire displacement accurately, it is necessary to measure with such optical or magnetic means both displacement and stretch in a control wire, but displacement only is sufficient for a measuring wire.

One of the advantages of optical, magnetic or accelerometer sensing means is that such means do not impose any physical force or effect upon the wire.

As an alternative to measuring the displacement of the control wires, it is possible to provide additional measuring wires running along the arm, separate from the control wires. The displacement of these wires may be measured as described above. This has the advantage that there is no load on the wires, and thus the tension on the wires does not vary. However, it requires more space and a more complex construction, and is thus most suitable for larger arms.

BRIEF DESCRIPTION OF THE DRAWINGS

In order that the invention may be more readily understood, reference will now be made, by way of example, to the accompanying drawings, in which.

DETAILED DESCRIPTION OF THE INVENTION

Figure 1:
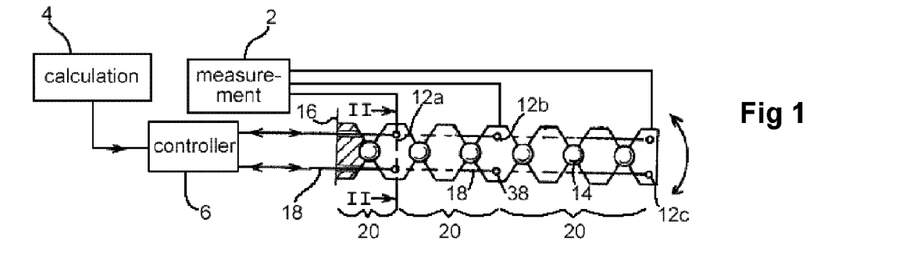
FIG. 1 is a diagrammatic representation of a robotic arm in accordance with the present invention.
Figure 2:
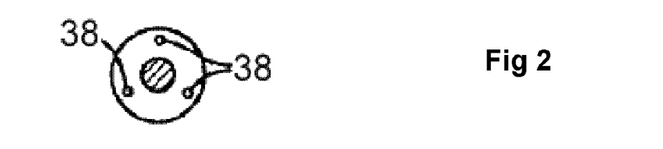
FIG. 2 is a section through FIG. 1 taken along lines II-II showing the disposition of the control wires.

Referring to FIG. 1, a robotic arm 10 comprises a plurality of elements in the form of links 12 connected by articulated joints 14. The arm is mounted on a base plate 16 at the proximal end. A plurality of control wires 18 extend from a controller 6 through the base plate 16 and through apertures 38 in the periphery of each link 12. The control wires 18 are arranged into groups of three which are circumferentially spaced as shown in FIG. 2, each group terminating at a particular link 12a, 12b, or 12c along the arm by being bonded to the link. Where a group of wires terminates, this link is the control link, and defines the end of a segment 20. Movement of the group of control wires 18 by the controller controls the position of that particular control link 12a, 12b or 12c, and thus of the associated segment 20.

Measurement means 2 gather position data for example from the control link in each segment, as will be described above. Calculation means 4 is provided to process the position data and compare the actual measurement position of the arm with the theoretical or predetermined position. Any difference leads to the calculation of compensatory movement required, and this is communicated to the controller 6 to be translated into movement of the control elements 12a, 12b, 12c.

Figure 3:
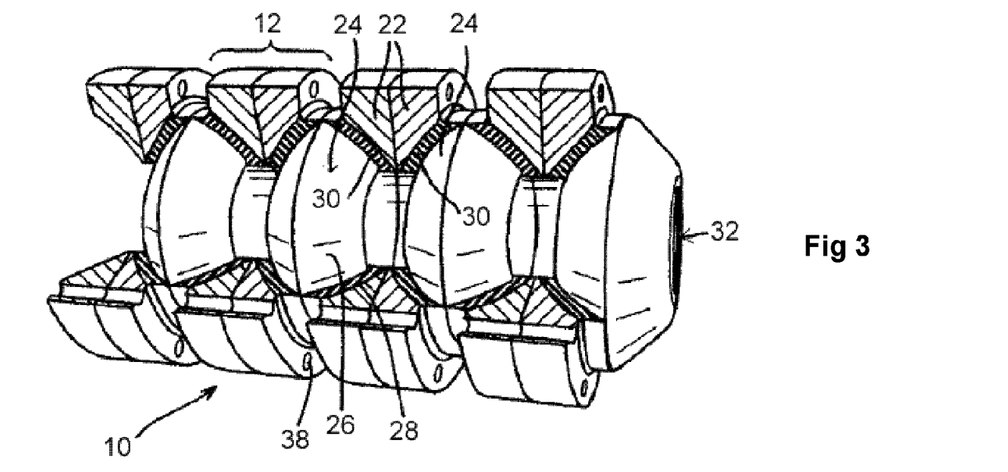
FIG. 3 is a perspective view partially cutaway of a particular embodiment of the arm in accordance with the present invention.
Figure 4:
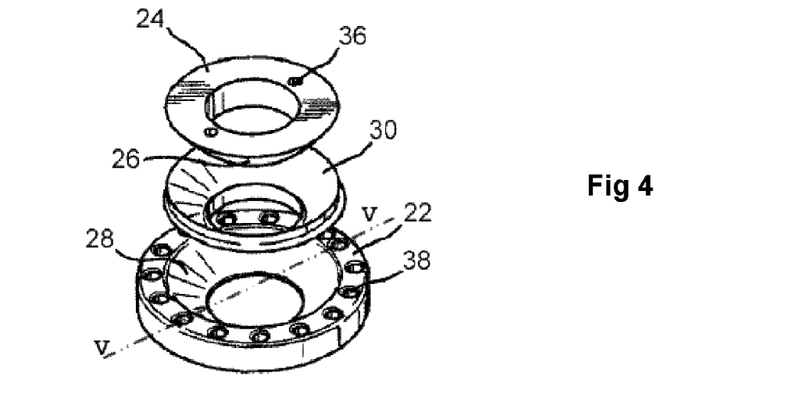
FIG. 4 is an exploded diagram of part of the arm of FIG. 3.

Referring to FIGS. 3 and 4, each link 12 may comprise a pair of outer discs 22, and each articulation may comprise a pair of inner discs 24. The inner discs 24 are shaped to provide arcuate convex outer surfaces 26, the outer discs each having matching arcuate concave inner surfaces 28. These corresponding surfaces 26, 28 are connected together by a thin rubber or elastomer layer 30 bonded to each of the surfaces. The inner and outer discs 22, 24 are each provided with a central bore defining a conduit 32 running along the centre of the arm for accommodating a power supply, information bus or control mechanism for a work head to be mounted at the end of the arm.

Figure 5:
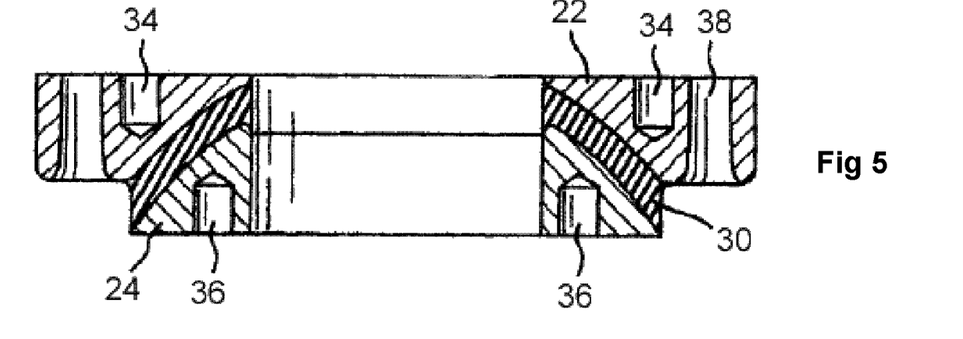
FIG. 5 is a section on the line V-V of FIG. 4.

Referring also to FIG. 5, each outer disc 22 and each inner disc 24 includes a plurality of spaced dowel holes 34, 36 respectively. Thus when an assembly of one outer disc 22 and one inner disc 24 is placed adjacent another with dowel pins located in the holes 34, 36, the arm assembly may be held together under tension by the control wires. Each outer disc comprises a plurality of conduits 38 for accommodating the control wires 18.

Figure 6:
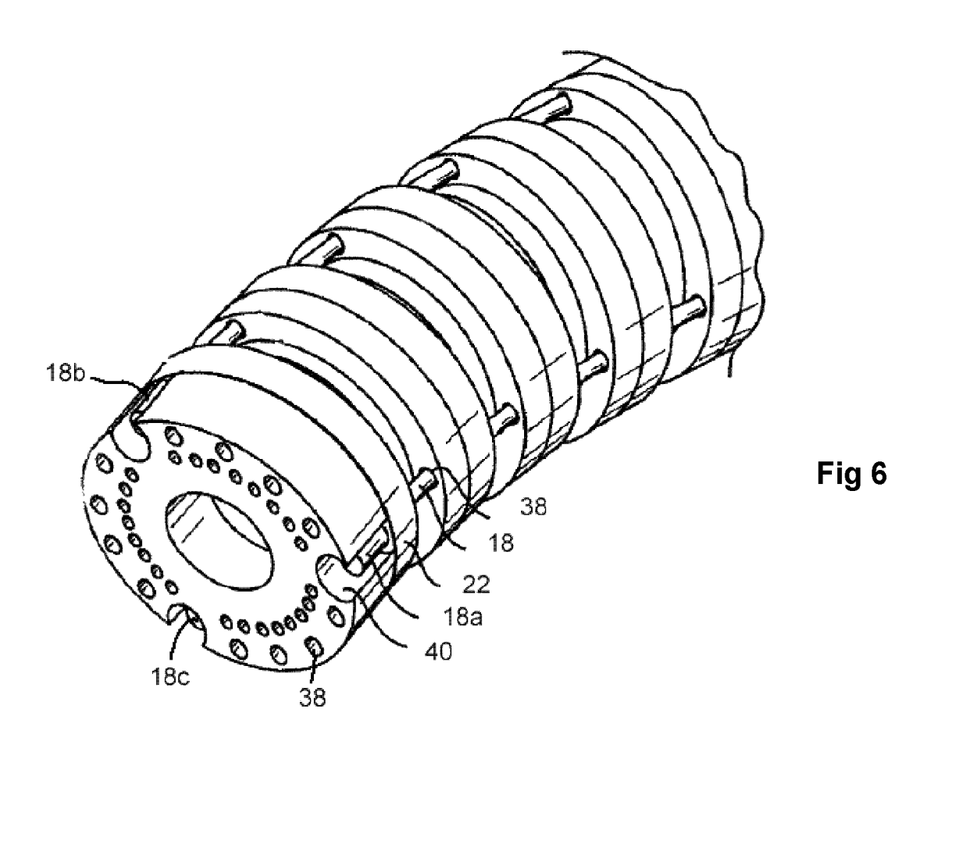
FIG. 6 is a perspective view showing a segment end of an arm according to the invention.

At the end of a segment, three of the control wires 18a, 18b, 18c terminate and are fixed into enlarged recesses 40 in one of the outer disc 22 of the link defining the end of the segment (see FIG. 6). Several such segments may be joined end to end to produce an arm of the appropriate length, with further groups of control wires passing on through the conduits 38 to the further segments. The control wires 18 are tensioned towards the base plate to maintain the links under a compressive load holding the link assemblies together.

Figure 7:
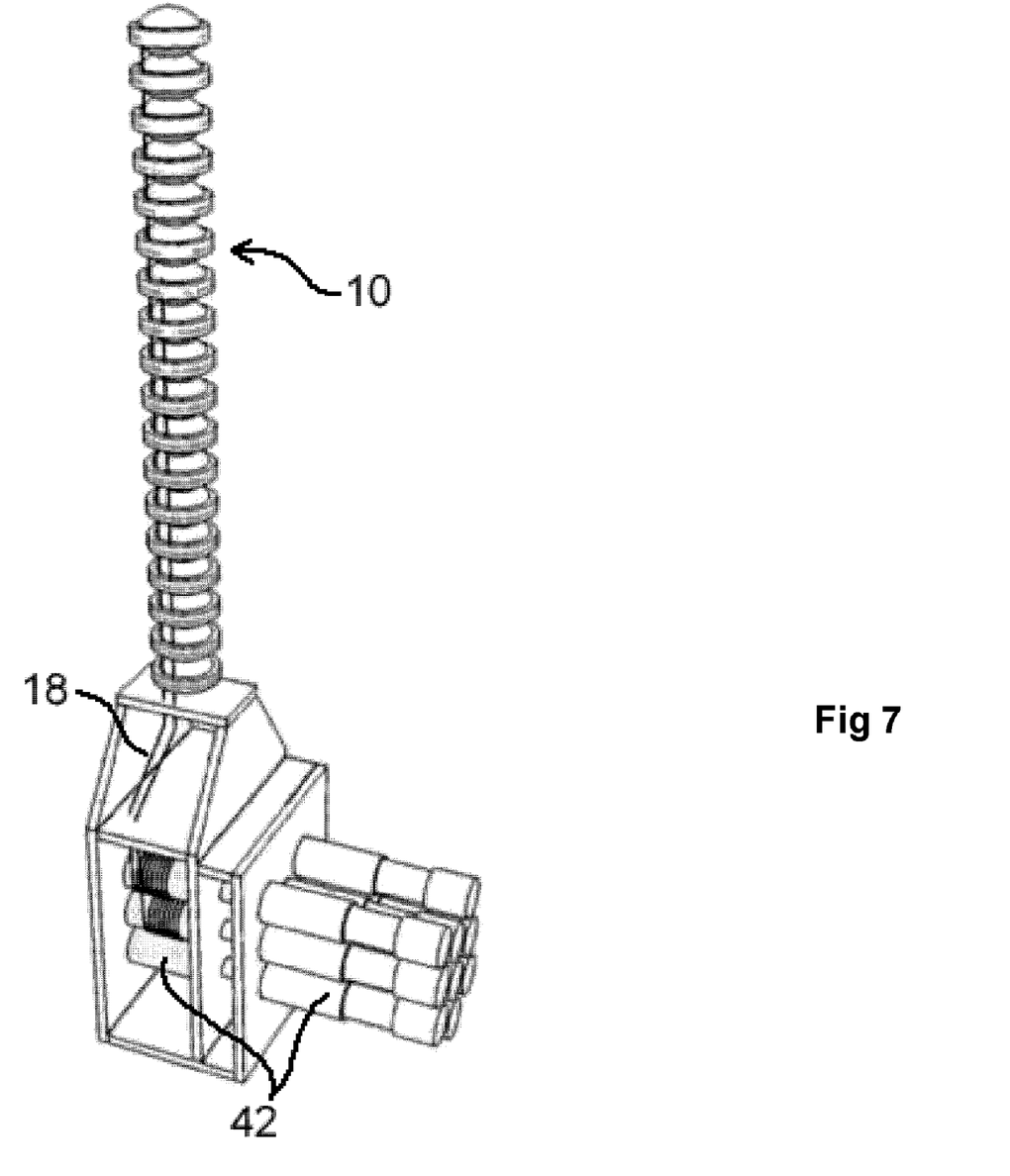
FIG. 7 is a perspective of an arm in accordance with the present invention.

Referring to FIG. 7, the wires 18 pass through the base plate and are each wound onto a respective capstan 42. Rotational movement of each capstan 42 is therefore used to control the position of the arm, using a computer control system (not shown).

Figure 8:
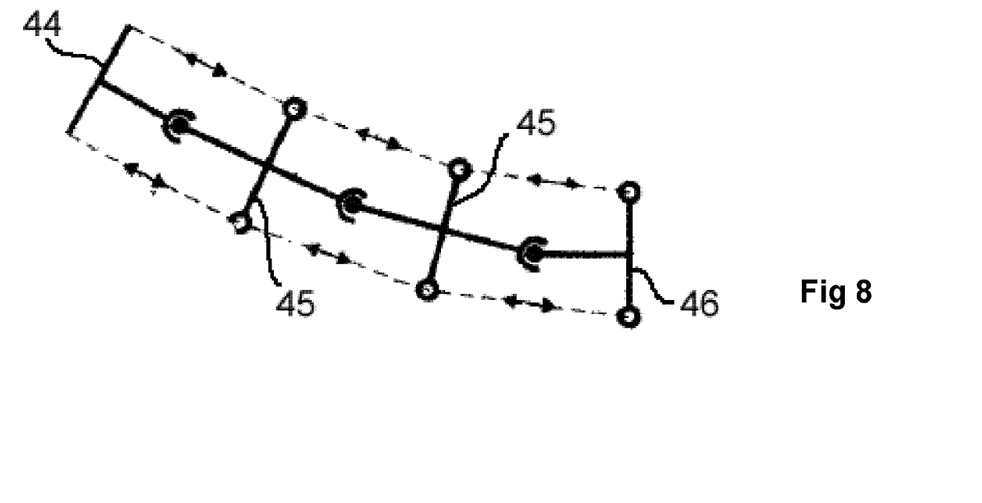
FIG. 8 is a diagrammatic representation of an arm segment according to one embodiment of the invention.
Figure 9:
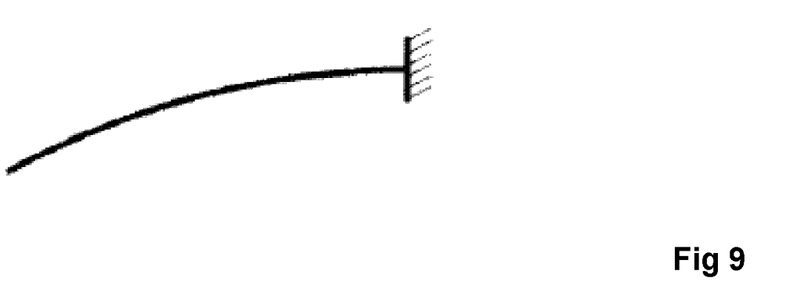
FIG. 9 is a diagram of forces an the arm.

The control principle is illustrated in FIG. 8. Movement of the control wires determines the position of the transverse plate 44 of a link at the distal end of a segment. The "passive" links 45 between the proximal end link 46 and the distal end link 44 then cause the arm to adopt an arcuate shape over the segment. In an idealised segment, this would be the precise arc of a circle. However in reality gravity and payload may cause the arm to deviate from this shape, as illustrated in FIG. 9.

Figure 10:
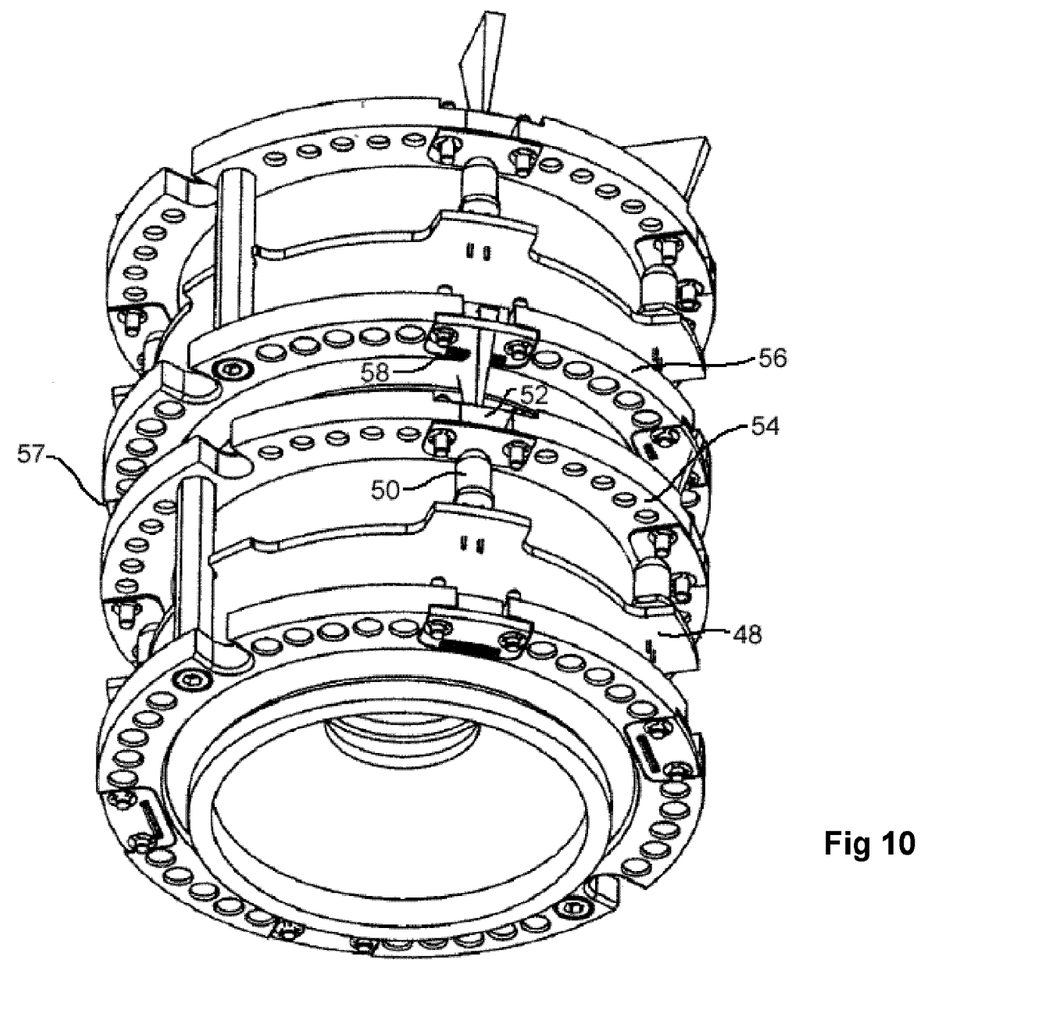
FIG. 10 is a perspective view of a robotic arm according to another embodiment of the invention.

FIG. 10 shows means for measuring the relative positions of adjacent links to determine the extent of this effect. The assembly of FIG. 10 includes mounting plates 48 between the inner discs 24 of each pair which hold LEDs 50 adjacent the periphery thereof. In this assembly the outer discs 54, 56 are shaped so as to have a space 57 between the peripheries thereof. Light from the LEDs 50 is directed through slots 52 provided in the periphery of one of the outer discs 54 of each pair. The other outer disc 56 of the pair includes an array 58 of light sensors on the inner surface of the periphery thereof aligned with the slot 52. The array 58 is arranged substantially tangentially of the disc 56 such that the light from the LED emerging through the slot 52 sweeps over the array 58 during relative movement of one link with respect to another. If four such arrangements are provided circumferentially spaced around the link assembly, it is possible to determine the pose of the adjacent outer discs and thus the exact shape of the arm.

Figure 16:
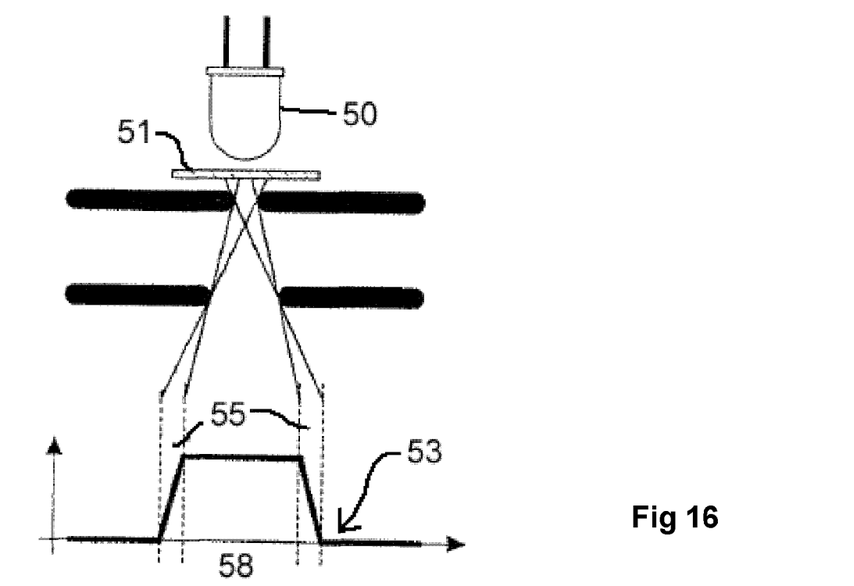
FIG. 16 is a diagram of the measuring means of the arm of FIG. 10.
Figure 17:
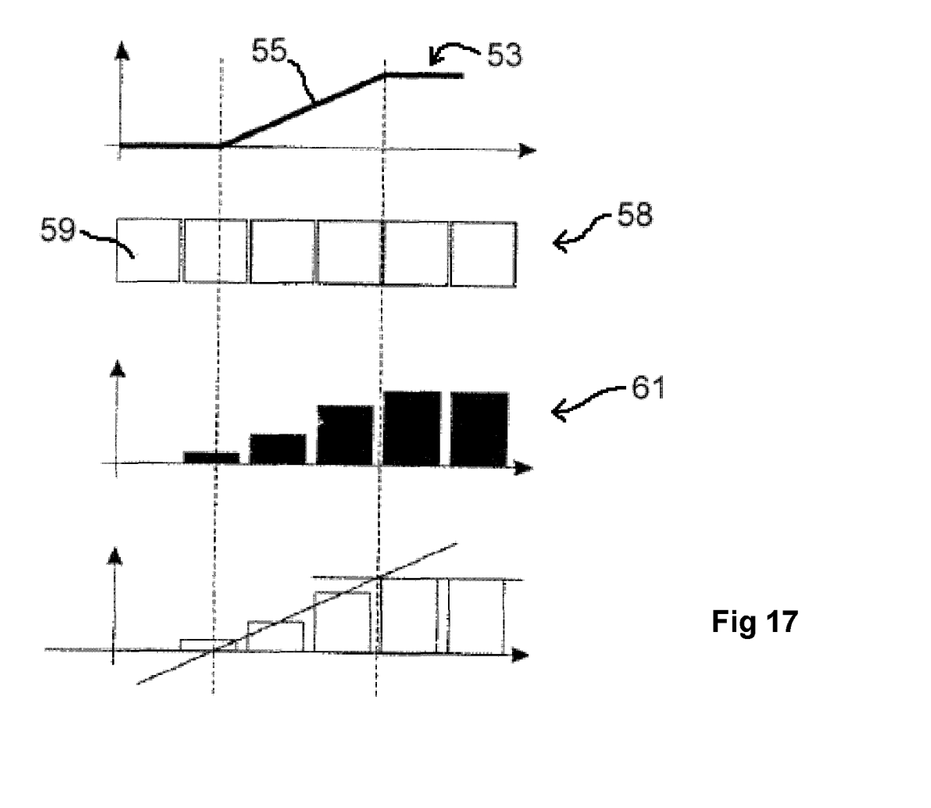
FIG. 17 is a set of graphs showing information obtained from the measuring means of FIG. 16.

Referring to FIG. 16, the arrangement is shown in more detail. The beam source of LED 50 is mounted behind a diffuser 51 adjacent the slot 52. The slot 52 widens in a direction away from the source 50. A graph 53 shows the resulting beam intensity v. position at the plane of the sensor array 58 with pernumbra 65 on either side. As can be seen from FIG. 17, the arrangement is such that a pernumbrum 55 covers at least 2½ pixels 59 of the array 58. A histogram 61 of pixel values can be used to produce a "best fit" line 63, and thus to infer the edges of the pernumbrum 55. Thus the middle of the prenumbrum can be ascertained to better definition than the pixel 59 width. Therefore two pieces of information can be derived from the beam array set.

Figure 11:
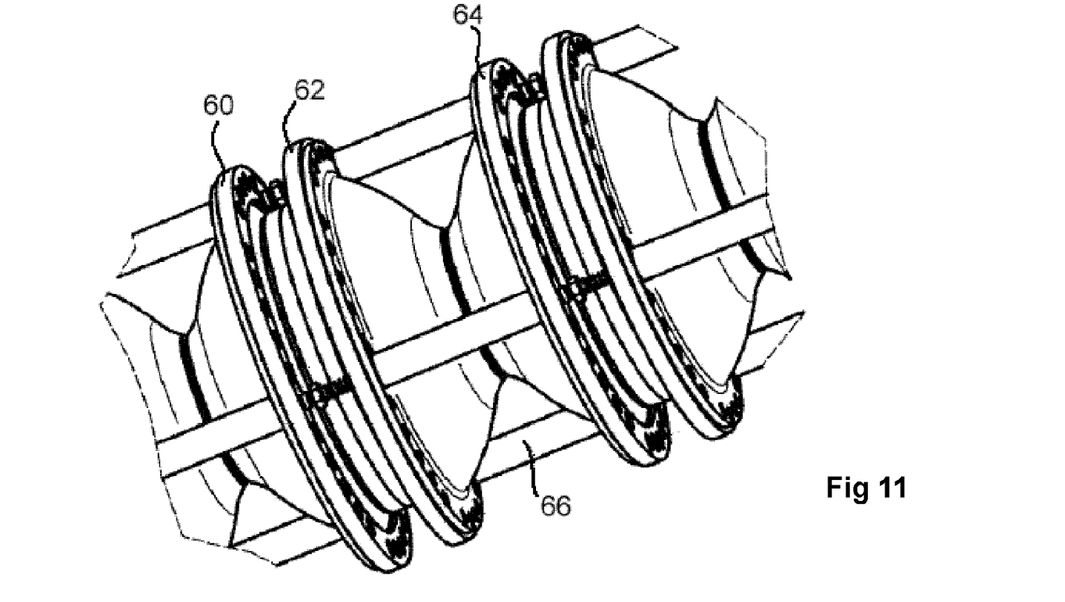
FIG. 11 is a perspective view of a robotic arm according to a further embodiment of the invention.
Figure 12:
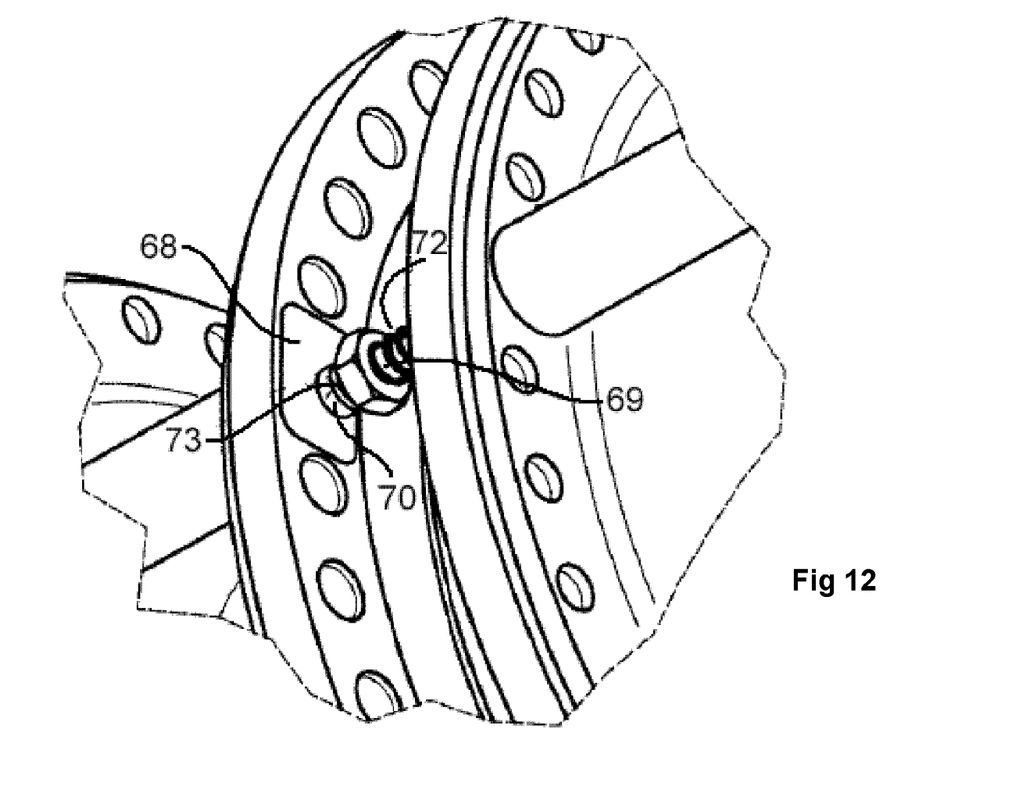
FIG. 12 is an enlarged view of part of the arm of FIG. 11.

Another way of determining the relative positions of adjacent outer discs is shown in FIG. 11. In this example potentiometers are provided between the links. A potentiometer body 69 extends between the outer discs 62, 64 of adjacent links. Between the pair of discs 60, 62 of each link, a preloaded spring 72 holds a pad 70 against a smooth reaction surface 68. The pad 70 is mounted on a ball socket 73 at the end of the potentiometer shaft 69 to allow rotation of the pad. Thus relative movement of the links causes a measurable linear movement in the potentiometer. Therefore each potentiometer reading indicates the distance between adjacent links at the mounting point.

It will be appreciated that three such potentiometers provided spaced around the circumference of the link assembly will provide sufficient information to determine the relative angular position of the transverse planes of adjacent links (i.e. the distance to and orientation of the plane of the next link). Thus the actual arm shape may be determined in this type of arrangement where there is little or no torsional and shear movement between links.

This arrangement has the advantage that the potentiometers may be sealed, so that the control wires may be lubricated without fouling them. The potentiometers also require very little space, and can also be sampled faster than optical sensors such as those shown in FIG. 10.

Figure 13:
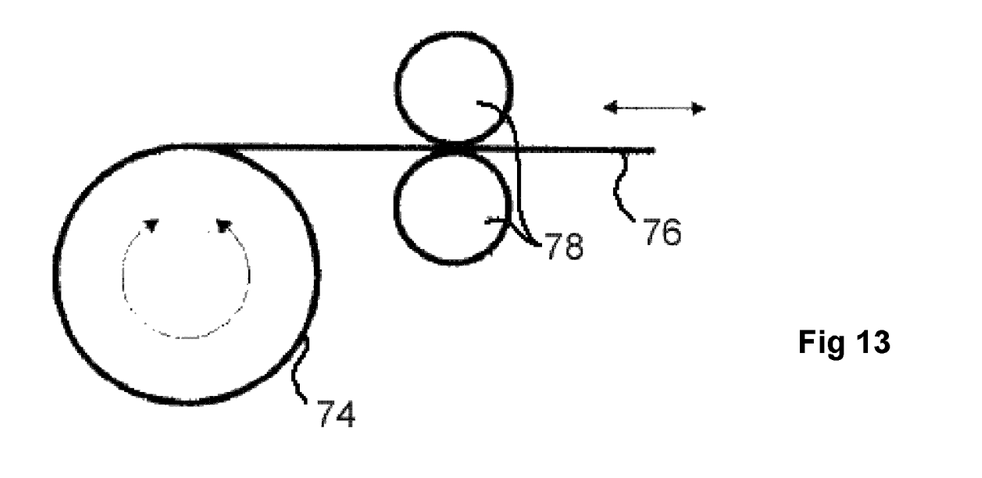
FIGS. 13, 14 and 15 are diagrams of various measuring means for use with an arm according to the invention.

Another way of measuring the actual shape of the arm is to run measuring wires through the periphery of the link assemblies as well as the control wires, and then to measure the length of such wires. Such measuring wires may extend from the base plate and either terminate at a link the position of which is to be measured, or may loop around at that link and return through the base plate. The measuring wires may be wound onto a drum 74 as shown in FIG. 13. The wire 76 may pass through a pair of pinch rollers 78. Measurement of the angular movement of one of the pinch rollers provides an accurate indication of the length of the measuring wire. Thus the distance to the link may be determined accurately, and if three such measuring wires 76 are used which are circumferentially spaced around the link, the angle of the transverse plane of the link may also be determined.

Figure 14:
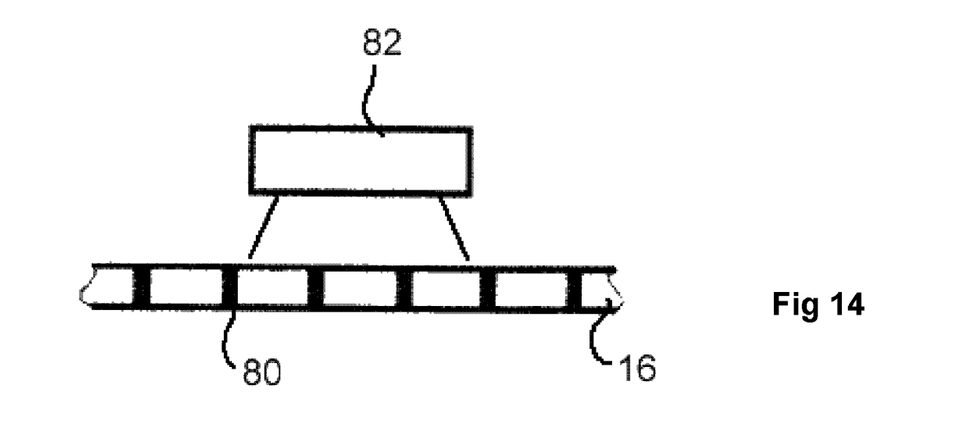
Figure 15:
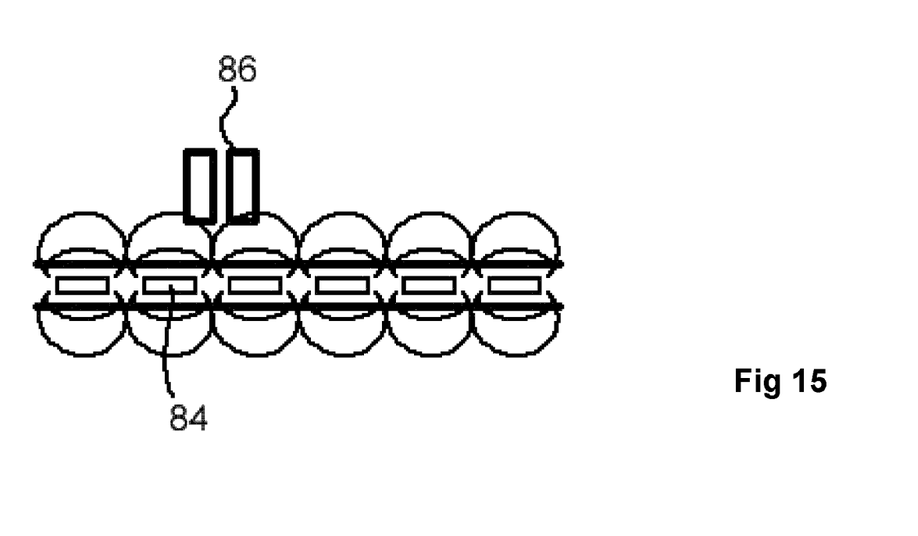

An alternative method of determining the length of the measuring wire 76 is by providing the wire with optical markings 80 and positioning an optical sensor 82 adjacent the measuring wire 76, as shown in FIG. 14. Yet another method of measuring the length of the measuring wire 76 is to embed magnets 84 therein. Hall-effect sensors 86 positioned adjacent the measuring wire may then be used to measure the movement of the wire.

Where the control wires are wound onto capstans, each capstan commonly has a motor and an encoder for control thereof. However it will be appreciated that the angular movement of the capstan is not always an accurate indication of the amount of wire paid out or reeled in to the capstan. This is because of elasticity of the wire, friction when in contact with the drum etc. Therefore the wire measurement techniques described above could also be used to measure the travel of the wire adjacent each capstan. This will give a more accurate measurement of the length of each control wire, which in turn gives a more accurate measurement of the shape of the arm. It is therefore possible to use the information from these wire measurement techniques to adjust the control of the capstans.

What is claimed is:

1. A robotic arm comprising at least one segment having a plurality of articulated elements, comprising a control element and at least one passive element, a controller for controlling the position of the arm by acting on the control element of each segment, and a measuring device associated with the controller and arranged to measure the relative position of at least one element in each segment with respect to at least one other element in the arm for determining the actual shape of the arm, in which the measuring device is arranged to measure the relative position of at least one pair of adjacent elements in each segment.

2. The robotic arm as claimed in claim 1, comprising a calculating unit associated with the controller and the measuring device for calculating a difference between the actual shape of the arm and a predetermined shape, and for applying a correction to the controller corresponding to the difference.

3. The robotic arm as claimed in claim 1, in which the measuring device is arranged to measure the angular relationship between the transverse planes of the elements.

4. The robotic arm as claimed in claim 1, in which the measuring device is arranged to measure the relative pose of the elements.

5. The robotic arm as claimed in claim 1, in which the measuring device comprises an energy generator for generating an energy beam carried by one element in the pair of adjacent elements, and an array of energy sensors carried by the other element in the pair of adjacent elements, adapted to sense the energy beam.

6. The robotic arm as claimed in claim 5, in which the energy beam is electromagnetic energy, preferably light, and the sensors comprise an elongate array of sensors that extend along an expected path of movement of the beam.

7. The robotic arm as claimed in claim 5, in which the measuring device comprises a plurality of spaced pairs of the said generators and sensors.

8. The robotic arm as claimed in claim 1, in which the measuring device is arranged to measure the distance between adjacent elements at a plurality of spaced positions.

9. The robotic arm as claimed in claim 8, in which the measuring device comprises a plurality of linear potentiometers mounted between the elements at or adjacent the periphery thereof.

10. A robotic arm comprising at least one segment having a plurality of articulated elements, comprising a control element and at least one passive element, a controller for controlling the position of the arm by acting on the control element of each segment, and a measuring device associated with the controller and arranged to measure the relative position of at least one element in each segment with respect to at least one other element in the arm for determining the actual shape of the arm, in which the controller comprises at least one group of control wires attached to an associated control element, each control wire having an actuator for altering the length of the wire, and in which the measuring device comprises a wire displacement measuring device arranged to measure directly the length of each control wire.

11. The robotic arm as claimed in claim 10, in which the wire displacement measuring device comprises a pair of pinch rollers disposed one on either side of each wire, and a sensor arranged to sense the angular displacement of at least one of the rollers.

12. The robotic arm as claimed in claim 10, in which the wire displacement measuring device comprises a sensor for sensing the position of at least one marker of the wire.

13. A robotic arm comprising at least one segment having a plurality of articulated elements, comprising a control element and at least one passive element, a controller for controlling the position of the arm by acting on the control element of each segment, and a measuring device associated with the controller and arranged to measure the relative position of at least one element in each segment with respect to at least one other element in the arm for determining the actual shape of the arm, in which the measuring device comprise a wire displacement measuring device arranged to measure the displacement of a group of measuring wires associated with each element the position of which is measured.

14. The robotic arm as claimed in claim 13, in which the wire displacement measuring device comprises optical or magnetic sensors.

15. The robotic arm as claimed in claim 13, in which the wire displacement measuring device comprises a sensor for sensing the position of at least one marker of the wire.

16. A method of operating a robotic arm, the arm comprising at least one segment having a plurality of articulated elements, comprising a control element and at least one passive element, the method comprising:
controlling the position of the control element in each segment;
measuring the relative position of at least one pair of adjacent elements in each segment;
calculating a difference between the relative position measured and a predetermined position; and
applying a correction to compensate for the difference.

* * * * *